United States Patent
Tanguy

[11] 3,785,393
[45] Jan. 15, 1974

[54] FLUID POWER BRAKING AND STEERING SYSTEM

[75] Inventor: Christian Tanguy, Frepillon, France

[73] Assignee: Societe Anonyme D.B.A.

[22] Filed: May 2, 1972

[21] Appl. No.: 249,596

[30] Foreign Application Priority Data
May 7, 1971    France .............................. 7116534

[52] U.S. Cl. ..................... 137/110, 60/84, 60/418, 137/118
[51] Int. Cl. ........................................... G05d 11/00
[58] Field of Search ......................... 137/110, 118; 60/418; 180/79.2 A, 79.2 B, 79.2 C, 79.2 R

[56] References Cited
UNITED STATES PATENTS
| | | | |
|---|---|---|---|
| 2,846,850 | 8/1958 | Hall | 137/118 X |
| 2,799,996 | 7/1957 | Van Meter | 137/118 X |
| 3,692,039 | 9/1972 | Ewald et al. | 137/118 |
| 3,575,192 | 4/1971 | MacDuff | 137/118 X |
| 3,703,186 | 11/1972 | Brewer | 137/118 X |

Primary Examiner—Robert G. Nilson
Assistant Examiner—Edward Look
Attorney—Ken C. Decker et al.

[57] ABSTRACT

The vehicle hydraulic system comprises a pump, an accumulator adapted to energize a closed-centre power brake booster, and a open-centre power steering mechanism, the supply line of the power steering mechanism including a throttle in parallel relationship with a control valve. The valve member of the said control valve is actuated by a stepped piston responsive to the fluid pressures in the accumulator and in the supply line downstream said throttle, both pressures acting against a spring, thereby insuring a minimum level of pressure in the accumulator.

2 Claims, 1 Drawing Figure

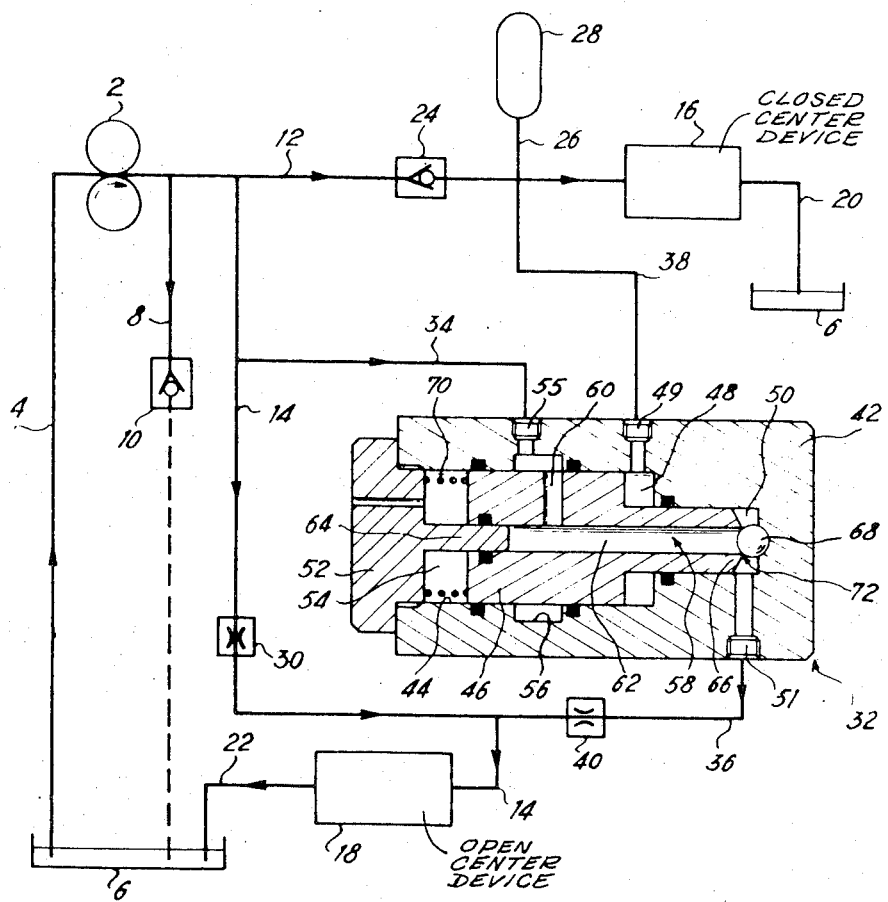

FLUID POWER BRAKING AND STEERING SYSTEM

The invention relates essentially to a hydraulic system by means of which an open-centre receiver device and a pressure fluid accumulator capable of co-operating with a closed-centre device can be supplied simultaneously from a single fluid pressure source.

A hydraulic system already proposed comprises a pressure fluid source supplying both an accumulator and, by way of a first throttle, an open-centre receiver device, a bypass duct connected in parallel with the first throttle, and a control valve designed to control the passage of the pressure fluid into the bypass, so that the open-centre receiver device has priority in respect of the supply. A hydraulic circuit of this type can be used on a vehicle having a brake-assisting servo motor supplied by the accumulator and a servo steering valve defining the open-centre receiver device. In such an arrangement the servo steering valve, when operated by the driver, generally has priority over the accumulator in respect of the supply, with the result that the accumulator cannot be recharged. When cornering, therefore, the driver has only a limited reserve of power for the brake-assisting servo motor.

In order to obviate this disadvantage the invention proposes a pressure fluid source supplying a pressurized fluid accumulator and an open-centre receiver device, wherein the supply line of said receiver is provided with a first throttle and a control valve in by-pass relationship with said throttle, said control valve comprising a valve member actuated by piston means which are responsive to the fluid pressure in the accumulator and the fluid pressure downstream of the throttle, both pressures acting against resilient means, thereby opening said control valve when the sum of the corresponding pressure forces reaches a predetermined value.

According to another feature of the invention, the control valve comprises a body in whose stepped bore the piston means are slidably mounted, the latter being stepped so as to define in the bore a first chamber connected to the accumulator and a second chamber connected to a place downstream of the first throttle.

It will be readily appreciated that the value for the fluid pressure in the accumulator when the bypass opens, hereinafter termed the opening pressure, depends on the fluid pressure prevailing in the second chamber immediately before opening of the bypass.

In particular, when the driver operates the servo steering valve, the effective fluid passage cross-section in this valve is restricted. The pressure therefore rises in the circuit supplying the servo steering valve, especially in the second chamber, enabling the bypass to be opened. The more fully the servo steering valve is operated, of course, the lower is the "opening pressure"when the bypass comes into operation. The dimensions of the various components are selected so that when the servo steering valve is fully actuated the minimum fluid pressure in the accumulator permits completely safe use of the braking system. It will also be appreciated that with such characteristics the dimensions of the accumulator can be considerably reduced, which is a particular advantage for the car manufacturers.

According to a further feature of the invention, the body comprises an inlet orifice which is connected to a place upstream of the first throttle and which leads into the stepped bore and to a passage suitably disposed across the piston means in order to permit communication between the inlet orifice and the said second chamber, the said passage including a cylindrical bore of which one end slides in a fluid-tight manner on a projection secured to the body and the other end cooperates with a valve seat on the body to define therewith the said valve means controlling the flow of fluid from the inlet port to said second chamber.

With such characteristics, of course, the dimensions of the control valve can be considerably reduced. It will also be noted that in order to prevent the pressure of the fluid in the passage from reacting on the piston means, we have provided a projection attached to the body and capable of absorbing this reaction.

Further features of the invention will be apparent from the ensuing description, referring to the accompanying drawings, in which the single FIGURE is a diagram of a vehicle hydraulic system embodying the invention, the control valve of which being shown in longitudinal section.

As the FIGURE shows, the hydraulic circuit of the vehicle has a hydraulic pump 2 with a substantially constant delivery, defining a fluid pressure source and drawing fluid along a duct 4 from a reservoir 6. The delivery side of the pump 2 is connected to the reservoir 6 by a duct 8 containing a discharge valve 10, which is calibrated for a predetermined maximum pressure so that fluid can be discharged if excess pressure threatens to damage the system.

The pump 2 supplies ducts 12, 14 leading respectively to a closed-centre device 16 and to an open-centre receiver device 18. The closed-centre device 16 is a brake-assisting servo motor of any conventional type in which the power is supplied by pressure fluid contained in an accumulator. The open-centre receiver device 18 is a servo steering valve by way of example, such as disclosed in the U.S. Pat. No. 3,145,626. The outlets of the closed-centre device 16 and of the open-centre device 18 are connected by respective ducts 20, 22 to the reservoir 6 (shown in two parts in the drawing for convenience's sake).

The duct 12 supplying the closed-centre device 16 contains a non-return valve 24, downstream of which it is joined by a connecting duct 26 to a hydraulic pressure fluid accumulator 28. The duct 14 supplying the open-centre receiver device 18 contains a first throttle 30 and a control valve 32, connected in parallel with the first throttle 30 by means of ducts 34 and 36 connected respectively to places upstream and downstream of the throttle 30. The duct 36 contains a second throttle 40 which has a larger effective cross-section than the first throttle 30. A duct 38 connects the control valve 32 to the accumulator 28.

The control valve 32, shown in section in the FIGURE, comprises a body 42 with a stepped bore 44, in which a piston 46 is slidably mounted. The latter is stepped so as to define a first chamber 48 and a second chamber 50 inside the bore 44. The first chamber 48 communicates by way of a control orifice 49 with the duct 38, and the second chamber 50 communicates by way of an outlet orifice 51 with the duct 36.

A plug 52 fixed to the body 42 co-operates with the piston 46 to define a cavity 54 in the bore 44. This cavity 54 communicates with atmosphere through a passage in the plug 52.

The duct 34 is connected by an inlet orifice 55 to an annular groove 56 in the wall of the stepped bore 44.

A passage 58 in the piston 46 comprises a duct 60 connecting the annular groove 56 to a cylindrical bore 62. One end of this cylindrical bore 62 slides in a fluid-tight manner on a projection 64 integral with the plug 52, and the other end leads into the second chamber 50. As the FIGURE shows, that portion 66 of the piston 46 which contains the end of the cylindrical bore 62 leading into the second chamber 50 bears on a seat consisting of a ball 68 set in the end wall of the stepped bore 44, due to the effect of a helical spring 70 compressed between the plug 52 and the piston 46. The piston portion 66 and ball 68 therefore define valve means 72.

The circuit described above operates as follows.

Assuming that the accumulator 28 is discharged, that the driver is not actuating the servo steering valve 18 and that the bypass formed by the control valve 32 is closed, the pump 2 delivers fluid along the duct 14 in the direction of the servo steering valve 18. The pressure therefore rises upstream of the throttle 30 so that the accumulator 28 can be charged. The characteristics of the pump 2 and the effective fluid passage cross-section of the throttle 30 are such that the accumulator 28 can be charged with pressure fluid to a value well above the minimum value set by the designer, so that the brake-assisting system can be used with complete safety.

During this accumulator charging period, the fluid pressures upstream of the throttle 30, in particular in the accumulator 28 and in the first chamber 48, are substantially equal. The fluid pressure downstream of the throttle 30, in particular in the second chamber 50, is distinctly lower than the pressure upstream of the throttle 30 and is substantially constant.

When the fluid pressure in the accumulator 28 reaches a predetermined level, hereinafter termed the maximum opening pressure, the force acting on the piston 46, which is the resultant of the forces exerted by the respective fluid pressures in the chambers 48 and 50, is greater than the reacting force of the spring 70. The piston 46 is then urged towards the left in the FIGURE. The piston portion 66 is moved slightly off the ball 68, permitting a small flow of fluid through the passage 58.

Fluid then flows along the duct 36 and through the second throttle 40. The latter produces a head loss, which gives rise to a pressure rise in the second chamber 50. This increase in pressure acts on the piston 46, which moves further to the left and opens the passage 58 fully.

Clearly, this prevents the overheating of the fluid which would result from its passage through the small opening of the passage 58. Overheating is also prevented by providing the throttle 40 in the duct 36 with a substantially larger effective passage cross-section than the throttle 30.

The bypass formed by the duct 34, inlet orifice 55, annular groove 56, passage 58, second chamber 50, outlet orifice 51 and duct 36 therefore comes into operation, and the entire delivery of the pump 2 supplies the servo steering valve 18. The fluid pressure in the circuit has dropped to an intermediate level on opening of the bypass, and the non-return valve 24 maintains the fluid pressure in the accumulator 28. Since the piston 46 responds to pressure variations in the duct 34, the projection 64 has been provided to absorb the pressures reacting on the piston.

Assuming that the accumulator 28 is now charged and the servo steering valve 18 has still not been actuated, operation of the brake-assisting servo motor 16 by the driver causes a drop in the fluid pressure in the accumulator 28 and in the pressure in the first chamber 48. The piston 46 therefore moves towards the right of the FIGURE, closing the passage 58 when the fluid pressure in the accumulator 28 reaches a predetermined level, termed the closing pressure.

This closing pressure is lower than the maximum opening pressure, since the intermediate pressure prevailing in the second chamber 50 before closing of the passage 58 is greater than the pressure prevailing in this chamber when the passage is closed. The pressure therefore rises upstream of the throttle 30, and the accumulator charging cycle described above is then repeated.

If the bypass is operating, the driver may operate both the servo steering valve 18 and the brake-assisting servo motor 16 simultaneously. This produces a pressure drop in the accumulator 28 and in the first chamber 48 and a pressure rise in the bypass circuit, particularly the second chamber 50. The pressure charge is the greater, the more fully the servo steering valve 18 is operated. As the piston 46 is subjected to the sum of the forces resulting from the pressures prevailing in the chambers 48 and 50, closing of the bypass takes place when the closing pressure in the accumulator is appreciably lower than the maximum closing pressure. The dimensions of the control valve 32 are, of course, such that the closing pressure value is greater than the minimum pressure selected by the designer, so that the vehicle can be used in complete safety. When the closing pressure is reached in the first chamber 48, the force acting on the piston 46, which results from the effects of the pressures in the chambers 48 and 50, is smaller than the returning force of the spring, and the piston 46 is urged towards the right in the FIGURE, permitting closure of the passage 58. The accumulator 28 now has priority in respect of the supply, instead of the servo steering valve 18.

If the servo steering valve 18 is actuated during the accumulator charging cycle, the effective passage cross-section in the valve 18 is restricted. This causes a pressure rise in the servo steering valve supply circuit downstream of the pump 2, and in particular an increase in the fluid pressure in the second chamber 50.

The accumulator charging cycle continues. When the force which acts on the piston 46, and which is the resultant of the effects of the responsive pressures in the chambers 48 and 50, becomes greater than the returning force of the spring 68, the bypass opens, the accumulator charging cycle ends, and the servo steering valve 18 is supplied instead.

I claim:

1. In a hydraulic system including a fluid pressure source, a fluid accumulator pressurized by said source, and an open center receiver device operated by said source:
   a first throttle in the supply line communicating the pressure source with said open center receiver;
   a control valve in bypass relationship with said first throttle,
   said control valve including a body defining a stepped bore therewithin, stepped piston means slidably mounted in said bore and cooperating with the latter to define first and second chambers therewithin, a first inlet communicating one of the chambers to said supply line upstream of said first orifice, a second inlet communicating the other chamber with the accumulator, an outlet communicating said bore to said supply line downstream of said first throttle, passage means extending through said piston for communicating said first inlet with said outlet, normally closed valve elements in said bore controlling communication through said outlet, resilient means yieldably urging said piston to a position closing said valve elements, the pressure level in said chambers opposing said resilient means whereby the valve elements are opened when the sum of the corresponding pressure forces in said chambers reaches a predetermined value, said passage means including a cylindrical bore in said piston parallel to said stepped bore; and a projection secured to the body and extending into said stepped bore, one end of said cylindrical bore in said piston sealingly receiving said piston.

2. In a hydraulic system including a fluid pressure source, a fluid accumulator pressurized by said source, and an open center receiver device operated by said source:

a first throttle in the supply line communicating the pressure source with said open center receiver, a control valve in bypass relationship with said first throttle having an inlet and an outlet, said control valve including valve members controlling communication through the outlet, piston means for actuating said valve members, said piston means being responsive to the fluid pressure in the accumulator and the fluid pressure level upstream of the first throttle, resilient means opposing the fluid pressures acting on said piston means, whereby said resilient means urges said piston means to a position closing said valve elements when the sum of the fluid pressures acting on the piston means drops below a predetermined level, and a second throttle having a larger effective cross sectional area than that of the first throttle in the supply line communicating the outlet of the control valve and a port downstream of said first throttle.

* * * * *